May 6, 1958 G. N. GOODIER ET AL 2,833,966

HEAT CONDUCTING TUBE MOUNT

Filed June 13, 1956 2 Sheets-Sheet 1

INVENTOR.
GEORGE N. GOODIER
BILLY E. ORR

BY G. D. O'Brien
H. H. Losche
ATTORNEYS

HEAT CONDUCTING TUBE MOUNT

Filed June 13, 1956 2 Sheets-Sheet 2

INVENTOR.
GEORGE N. GOODIER
BILLY E. ORR
BY G. D. O'Brien
H. H. Losche
ATTORNEYS United States Patent Office 2,833,966

Patented May 6, 1958

2,833,966

HEAT CONDUCTING TUBE MOUNT

George N. Goodier, Indianapolis, and Billy E. Orr, West Lafayette, Ind., assignors to the United States of America as represented by the Secretary of the Navy Application June 13, 1956, Serial No. 591,249

3 Claims. (Cl. 317—101)

(Granted under Title 35, U. S. Code (1952), sec. 266)

The present invention relates to a chassis and case for mounting electronic components and more particularly to means for removing heat that is being dissipated within a case by electronic components.

In the design of components that are to be airborne, weight and space requirements are of the utmost importance and attempts are continually being made to miniaturize this type of equipment. However, the power requirements for operating these components are usually maintained at the same high level and consequently a great amount of energy in the form of heat is being dissipated within a very small volume. Unless this heat is adequately removed the useful life of many of the components, such as tubes, is greatly reduced, and also large temperature changes affect appreciably the overall accuracy of the units.

Heretofore various attempts have been made to help dissipate heat within a case. Frequently a fan is provided within a case to help dissipate the heat within, and also various cooling fluids are sometimes provided. While these devices often perform satisfactorily they have obvious disadvantages, one of which is the use of additional space required for mounting.

The invention described herein provides a novel way of obtaining effective cooling by providing a cylindrical case and having electronic components mounted on chassis that are of half-cylinder configuration. A novel means of mounting tubes is employed by providing curved metal blocks whose outer surfaces match the curvature of the inside cylindrical wall of the case. Two of these curved metal blocks are mounted on opposite ends of a spring, and this spring keeps the metal blocks biased against the inside cylindrical wall of the case, thus facilitating the removal of heat by conduction. A multiple number of these spring and curved block assemblies are provided and they are supported by a longitudinal stringer on the half-cylinder chassis. Spring clip tube mounts are fastened to the inside of the curved metal blocks, and small electronic tubes are held by these clips. A plurality of fins are provided on the outer surface of the case in order to facilitate the removal of heat.

It is therefore a general object of the present invention to provide a small, compact, electronic case that has means for readily removing heat that is being dissipated within.

Another object of the invention is to provide mounting means for small electronic tubes whereby the heat being dissipated by said tubes is transferred to the outer case by conduction.

Other objects and many of the attendant advantages of this invention will be readily appreciated as the same becomes better understood by reference to the following detailed description when considered in connection with the accompanying drawings wherein.

Figure 1:
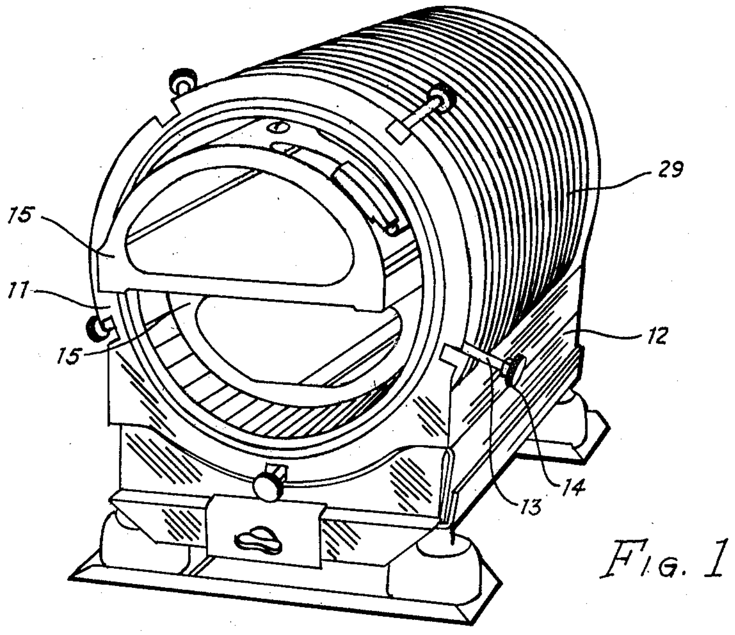
Figure 1 is a perspective view showing a pair of chassis within a case, the front cover being removed.
Figure 4:
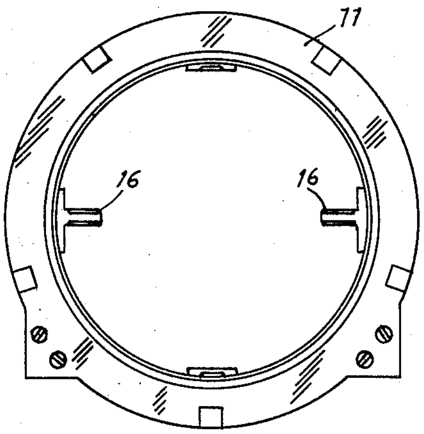
Figure 4 is a front view of the case showing a pair of guide rails for supporting a pair of half-cylinder shaped chassis.

Referring now to the drawings wherein like reference characters designate like or corresponding parts throughout the several views, there is shown in Figure 1 a cylindrical case 11 that is mounted on a shock and vibration chassis 12. The front cover, which is held in position by screws 13 and thumb nuts 14, is shown removed, and it can be seen that a pair of half-cylinder shaped chassis 15 can be mounted inside the case 11. As shown in Figure 4 of the drawings, a pair of guide rails 16 supports the top chassis and prevents the two chassis from making electrical or mechanical contact.

Figure 2:
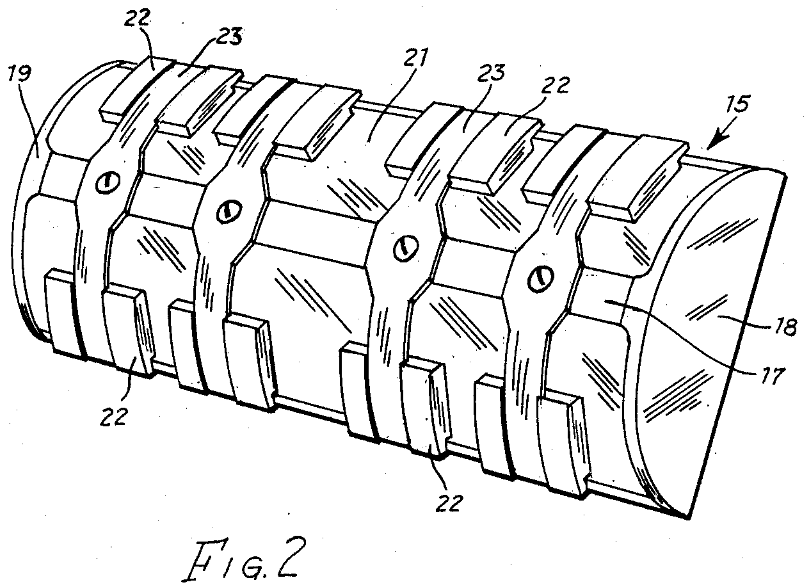
Figure 2 is a perspective view showing a plurality of spring-biased tube assemblies fastened to a chassis.

Referring to Figure 2 of the drawings, it can be seen that the chassis 15 has a longitudinal stringer 17 that extends between end plates 18 and 19. A terminal board 21 is provided along the bottom edge of the chassis and also extends between end plates 18 and 19, and various components such as resistors, capacitors, and the like can be mounted thereon.

Figure 3:
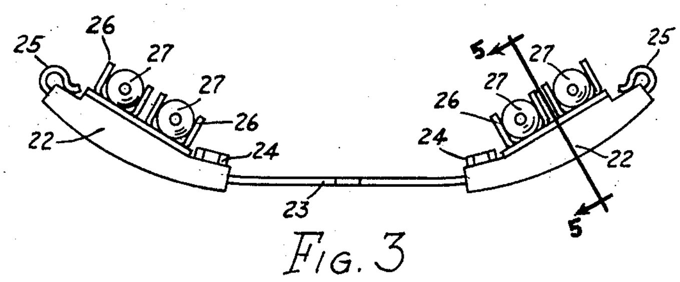
Figure 3 is a side view showing a pair of tube mounting blocks on a spring.
Figure 5:
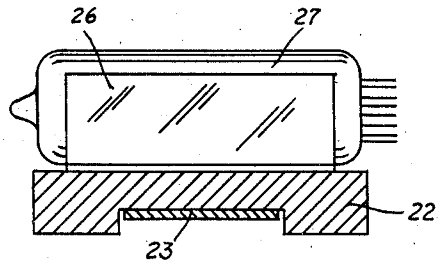
Figure 5 is a sectional view taken on line 5—5 of Figure 3.

Referring now to Figures 2, 3, and 5 of the drawings, a pair of tube mounting blocks 22 is shown attached ta a leaf spring 23 to form an assembly, and a multiple number of these assemblies is shown attached to the longitudinal stringer 17. Four assembled units are shown in Figure 2; however, it should be understood that a lesser or greater number could be employed, as would be required for any particular unit. Referring particularly to Figure 3 of the drawing, it can be seen that the outer contours of the mounting blocks 22 are curved to conform to the inner curved surface of the case 11, and that the mounting blocks 22 are recessed so that the outer contour protrudes beyond the outer edge of the spring. This recess permits the mounting block to be in contact with the inner surface of the case 11 and thus heat can readily be transferred to the case 11.

As shown in Figures 3 and 5 of the drawings, the mounting blocks 22 are held in position by a slide fastener 24 and a clip 25 formed on the end of the leaf spring 23. A pair of spring-type tube holders 26 are secured to each mounting block 22 for holding tubes 27. As the mounting block is held in position by a slide fastener 24 and clip 25, it can readily be removed from the leaf spring 23 in order to facilitate the mounting of tubes 27 in the holders 26. Thus a faulty tube can readily be replaced by a good tube. Likewise the leaf springs 23 are each secured to the longitudinal stringer 17 by a single quick-disconnect means 28 for easy removal.

When the assembled chassis, with its electronic components in place, is being inserted inside the case 11, it is necessary to depress the mounting blocks 22 so that the chassis unit will clear the inside diameter of the case. However, when the mounting blocks 22 are within the case, the leaf springs 23 will bias the mounting blocks outwardly against the inside wall surface of the case 11. Thus it can be seen that the chassis assembly will be held snugly in position between the guide rails 16 and the inside surface of the case 11. The mounting blocks 22 on the outer ends of leaf spring 23 provide a flexible cushion for holding the chassis assembly in position, yet the entire chassis assembly can readily be removed without any difficulty. Since the electronic tubes 27 are on the back side of the mounting blocks 22, the heat being dissipated by these tubes will heat the mounting blocks 22 and a heat transfer will take place from the tubes through the mounting blocks and to the case. The case 11 has a multiple number of fins 29 secured, as by welding, to the outer surface. These fins 29 provide an increased area and facilitate the cooling of the case 11.

From the foregoing description it should now be clear that a most satisfactory means has been devised for facilitating the removal of heat from within the interior of a case, and yet the chassis can be readily removed from the case with a minimum of effort. It should be understood, of course, that the foregoing disclosure relates to only a preferred embodiment of the invention and that numerous modifications or alterations may be made therein without departing from the spirit and the scope of the invention.

The invention described herein may be manufactured and used by or for the Government of the United States of America for governmental purposes without the payment of any royalties thereon or therefor.

What is claimed is:

1. A heat transferring device comprising, a cylindrical case; at least one chassis of half-cylinder configuration having a longitudinal stringer on the outer periphery thereof; a plurality of leaf springs each removably attached to said longitudinal stringer; a plurality of mounting blocks having one surface of same curvature as the inner wall of said cylindrical case, one each being removably attached to each end of said leaf springs whereby said leaf springs bias said mounting blocks against the inner wall of said cylindrical case; and means on each said mounting block for mounting electron tubes.

2. A heat transferring device comprising, a cylindrical case; first and second chassis of half-cylinder configuration each having a longitudinal stringer on the outer periphery thereof; a plurality of spring means each removably attached to the longitudinal stringer of each said chassis; a plurality of mounting blocks having one surface of same curvature as the inner wall of said cylindrical case, at least one being removably attached to each said spring means; and at least one metallic tube holder attached to each said mounting block.

3. A holding device for an electron tube comprising, a leaf spring adaptable for mounting to a chassis, first and second mounting blocks removably attached to the ends of said leaf spring, each said mounting block having one surface of same curvature as the inner wall of a cylindrical case that said holding device is to be mounted within, and at least one metallic tube holder attached to each said mounting block.

References Cited in the file of this patent

UNITED STATES PATENTS 2,787,735 Scal ---------------- Apr. 2, 1957